Nov. 1, 1938.   A. BARKINSKY ET AL   2,135,318
ELECTRIC BROILER
Filed Oct. 23, 1937
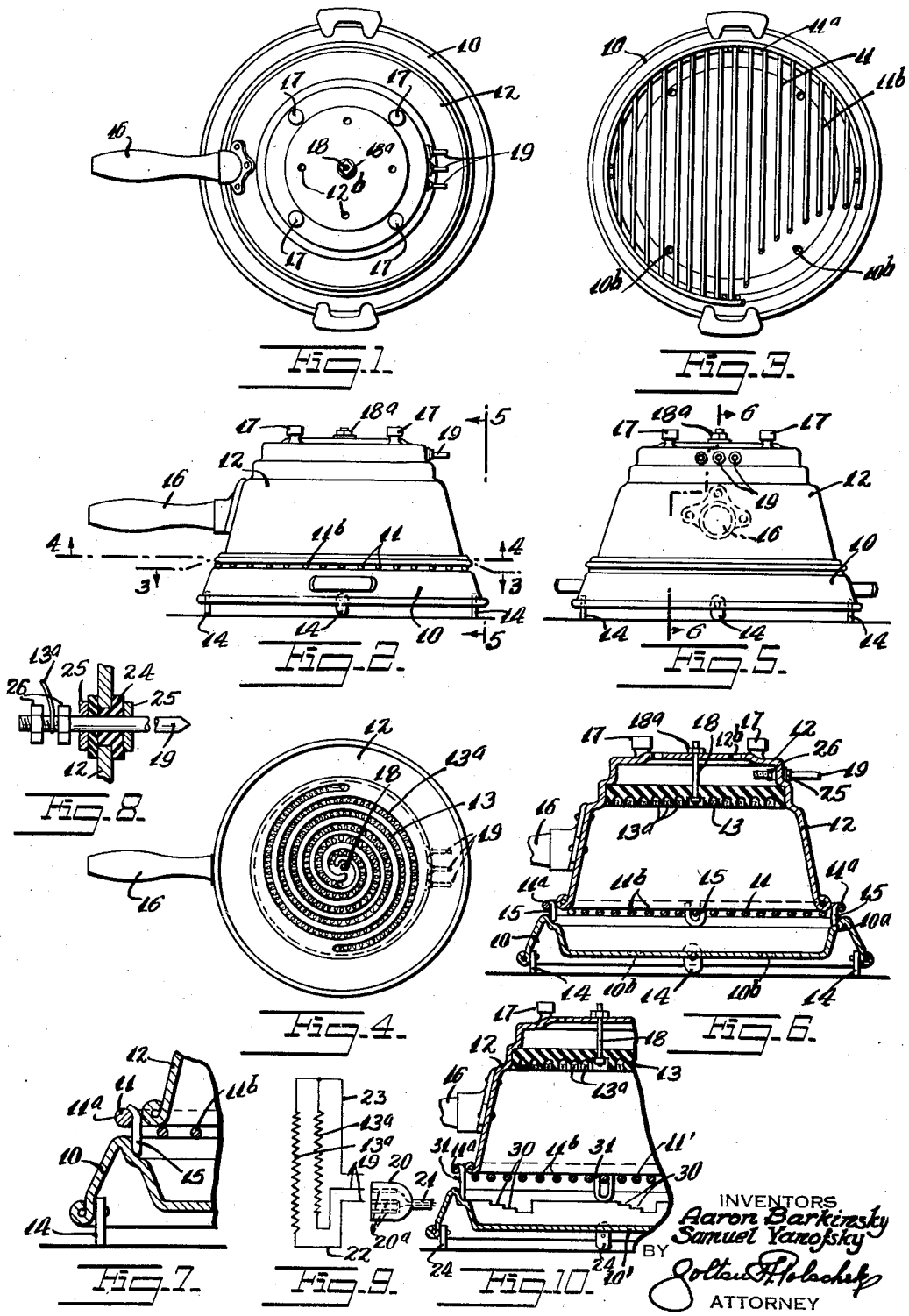

Patented Nov. 1, 1938

2,135,318

UNITED STATES PATENT OFFICE 2,135,318

ELECTRIC BROILER

Aaron Barkinsky and Samuel Yanofsky, Bronx, N. Y.

Application October 23, 1937, Serial No. 170,574

2 Claims. (Cl. 219—19)

This invention relates to new and useful improvements in an electric broiler.

More specifically, the invention proposes the construction of an electric broiler which may be used to broil meats and cook various foods and retain all of the juices and flavor of the food cooked.

Still further it is proposed to construct the broiler in such a manner that the heating unit thereof may also be used for any purpose to which a single unit electric stove may be used.

Another object of the invention is to mount a heating unit within the top portion of a deep hollow cover which may be engaged upon a grille positioned within a dish for broiling or cooking any foods supported on the grille.

Another object of the invention is to provide a grille with foot members which may be adapted to selectively engage recesses of varying depths formed in said dish for controlling the amount of air which will pass between said dish and the bottom edge of said cover.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a plan view of a broiler constructed according to this invention.

Fig. 2 is an elevational view of Fig. 1.

Fig. 3 is a sectional view taken on the line 3—3 of Fig. 2.

Fig. 4 is a sectional view taken on the line 4—4 of Fig. 2.

Fig. 5 is a sectional view taken on the line 5—5 of Fig. 2.

Fig. 6 is a sectional view taken on the line 6—6 of Fig. 5.

Fig. 7 is an enlarged detailed view of a portion of Fig. 6.

Fig. 8 is an enlarged detailed view of another portion of Fig. 6.

Fig. 9 is a schematic wiring diagram of the heating unit.

Fig. 10 is a view similar to Fig. 6 but showing a modification of the invention.

The electric broiler, according to this invention, includes a dish 10, and a grille 11 which is adapted to be supoprted on the periphery of the dish 10. A deep hollow cover 12 for engagement on the grille has a heater 13 mounted therein.

The dish 10 is constructed of aluminum or other easily cleaned and desirable material and is provided with foot members 14 of insulation material which are adapted to engage the surface upon which the device is positioned, and to prevent the heat from the dish from being transferred to the surface which would produce highly undesirable marks thereon. The grille 11 consists of a circular frame portion 11$^a$ having parallel wire elements 11$^b$ extending from one side of the circular portion 11$^a$ to the other side thereof and upon which the food to be cooked is supported. The edge of the circular portion 11$^a$ is provided with U-shaped foot members 15 which are adapted to engage a shoulder 10$^a$ formed along the periphery of the dish for supporting the grille 11 thereon.

The dish 10 and the hollow cover 12 are illustrated with a plurality of apertures 10$^b$ and 12$^b$, respectively to create a desirable air circulation.

The hollow cover 12 is provided with a handle 16 on one of its sides by which it may be moved and the top thereof is provided with feet 17 for resting the cover 12 in an inverted position upon a surface upon which the grille is supported. The heating unit 13 is mounted on the top wall of the deep hollow cover 12 and is provided with spiral heating elements 13$^a$ for uniform heating of the foods positioned on the grille 11. A screw 18 extends through the insulation material of the heating unit 13 and is provided at its outer end with a nut 18$^a$ for fixedly holding the heating unit in position on the top wall of the cover 12. This heating unit is of the double spiral three heat type for more even heating control. The cover 12 is provided with three contact pins 19 upon which the plug 20 of an electric circuit 21 may be engaged. The plug 20 is also provided with three openings 20$^a$ which are adapted to be engaged upon the three contact pins 19 extending from the cover 12. Two of the openings 20$^a$ in the plug 20, are electrically connected to form one terminal. The third opening forms the second terminal of the electric circuit 21 (see Fig. 9).

When the plug is positioned upon all three pins 19, in one position as illustrated in Fig. 9, the current will pass through one outside contact pin 19, through the wire 22 and one of the heating elements 13$^a$ and also through the center contact pin 19 through the other heating element 13$^a$, back to the other outside contact pin 19, to cause both of the heating units to operate in parallel, thus producing a "high" heat. But if the position of the plug 20 is reversed so that the two outside openings 20$^a$ which are connected to the circuit 21 are engaged on the other outside contact pins 19, the current will pass through the wire 23 to one of the elements 13ᵃ and then back through the center pin 19, thus producing a "medium" heat. When the plug 20 is in this position only one of the heating elements will be in operation. It is also possible to produce a "low" heat, by connecting the two heating elements 13ᵃ in series. This is accomplished by connecting only two of the three openings 20ᵃ in the plug 20, to the central terminals 19 and wire 22 of the heating units.

In this manner, the amount of heat may be readily changed by manipulating the insertion of the plug connector 20.

These contact pins 19 each extend through insulation members 24 which are mounted in openings in the top portion of the cover 12. Washer elements 25 are fixedly attached to portions of the pins 19 on either side of the insulation members 24 for fixedly holding these pins in position thereon. The inner ends of these pins 19 are provided with two nuts 26 between which the wires leading to the heating elements may be fixedly clamped.

According to the modification shown in Fig. 10 the dish element 10' is provided with a plurality of recesses 30 of varying depths and the grille 11' has foot members 31 which may be selectively engaged in the varying recesses 30 when the grille 11' is turned for controlling the amount of space between the top edge of the dish 10' and the bottom edge of the cover 12. In other respects this form of the invention is similar to the previous form and similar parts may be identified by corresponding reference numerals.

When the cover 12 is resting in its inverted position on its feet 17, pots or other small containers may be placed therein and rested on the heating elements 13 for using the heating unit in the same manner as a single unit electric stove.

While we have illustrated and described the preferred embodiments of our invention, it is to be understood that we do not limit ourselves to the precise constructions herein disclosed and the right is reserved to all changes and modifications coming within the scope of the invention as defined in the appended claims.

Having thus described our invention, what we claim as new, and desire to secure by United States Letters Patent is:—

1. In an electric broiler a relatively shallow dish formed with an inner peripheral shoulder, a relatively deep dish-like cover member, a heating element within the cover member at the upper area thereof, a grill having a plurality of spaced short depending lugs supported upon said peripheral shoulder within the dish and elevating the grill a relatively short distance above the peripheral surface of the dish, the cover member being directly supported upon the grill.

2. In an electric broiler, a dish having shoulder supporting means near its periphery bounding the open top of the dish, a grill supported upon said shoulder means, a relatively deep dish-like cover member, a heating element within the cover member at the upper area thereof, the cover member being reinforced at its peripheral margin and being inverted relatively to the grill, said reinforced peripheral margin being supported directly upon the grill in such manner as to provide for ingress of air between said reinforced periphery and the periphery of the dish.

AARON BARKINSKY.
SAMUEL YANOFSKY.